United States Patent

Tenpas

[15] 3,678,723
[45] July 25, 1972

[54] T-BAR TWISTER
[72] Inventor: Emerson J. Tenpas, Erie, Pa.
[73] Assignee: Eriez Manufacturing Company, Erie, Pa.
[22] Filed: Feb. 12, 1970
[21] Appl. No.: 10,819

[52] U.S. Cl. .................................................72/299
[51] Int. Cl. ............................................B21d 11/14
[58] Field of Search ............72/64, 65, 299, 298; 29/155

[56] References Cited

UNITED STATES PATENTS

| | | | |
|---|---|---|---|
| 2,352,442 | 6/1944 | Loewy et al. | 72/299 |
| 2,715,431 | 8/1955 | Grossu | 72/299 |
| 2,487,972 | 11/1949 | Katz | 72/299 |
| 2,632,494 | 3/1953 | Kopec | 72/64 |
| 3,280,607 | 10/1966 | Esken et al. | 72/299 |

FOREIGN PATENTS OR APPLICATIONS

| | | | |
|---|---|---|---|
| 558,203 | 12/1943 | Great Britain | 72/319 |
| 554,064 | 7/1957 | Canada | 72/65 |

OTHER PUBLICATIONS

Giwosky, H. L., " Special Twisting Fixture Straightens B-29 Spar Chords," American Machinist, March 15, 1945 pp. 117-118

*Primary Examiner*—Charles W. Lanham
*Assistant Examiner*—Michael J. Reenan
*Attorney*—Charles L. Lovercheck

[57] ABSTRACT

This disclosure shows a machine for bending and/or twisting a beam. The machine has a frame with a guide for the beam at each end. A twisting device in the form of a rotatable drum is supported on the frame and clamped to the beam and a calibrated scale is fixed to the frame to measure the amount of twist. A carriage is movably supported on the machine frame and can be clamped to the beam to advance the beam along the frame and to bend it.

6 Claims, 8 Drawing Figures

Patented July 25, 1972

INVENTOR.
EMERSON J. TENPAS
BY
Charles L. Lombard
ATTORNEY.

INVENTOR.
EMERSON J. TENPAS
BY
Charles L. Lovercheck
ATTORNEY.

INVENTOR.
EMERSON J. TENPAS

Patented July 25, 1972 3,678,723

INVENTOR.
EMERSON J. TENPAS
BY
Charles L. Lambert
ATTORNEY.

Patented July 25, 1972 3,678,723

INVENTOR.
EMERSON J. TENPAS
BY
Charles L. Lovercheck
ATTORNEY.

T-BAR TWISTER

STATEMENT OF THE INVENTION

This invention relates to machines for shaping structural members and, more particularly, to a machine for forming predetermined curves in a structural beam.

OBJECTS OF THE INVENTION

It is an object of the invention to provide a machine for shaping structural members.

Another object of the invention is to provide a machine for twisting and bending structural members.

Another object of the invention is to provide an improved machine for straightening beams and for putting predetermined twists and curves in the said beams.

DETAILED DESCRIPTION OF THE DRAWINGS

Frame

Figure 1:
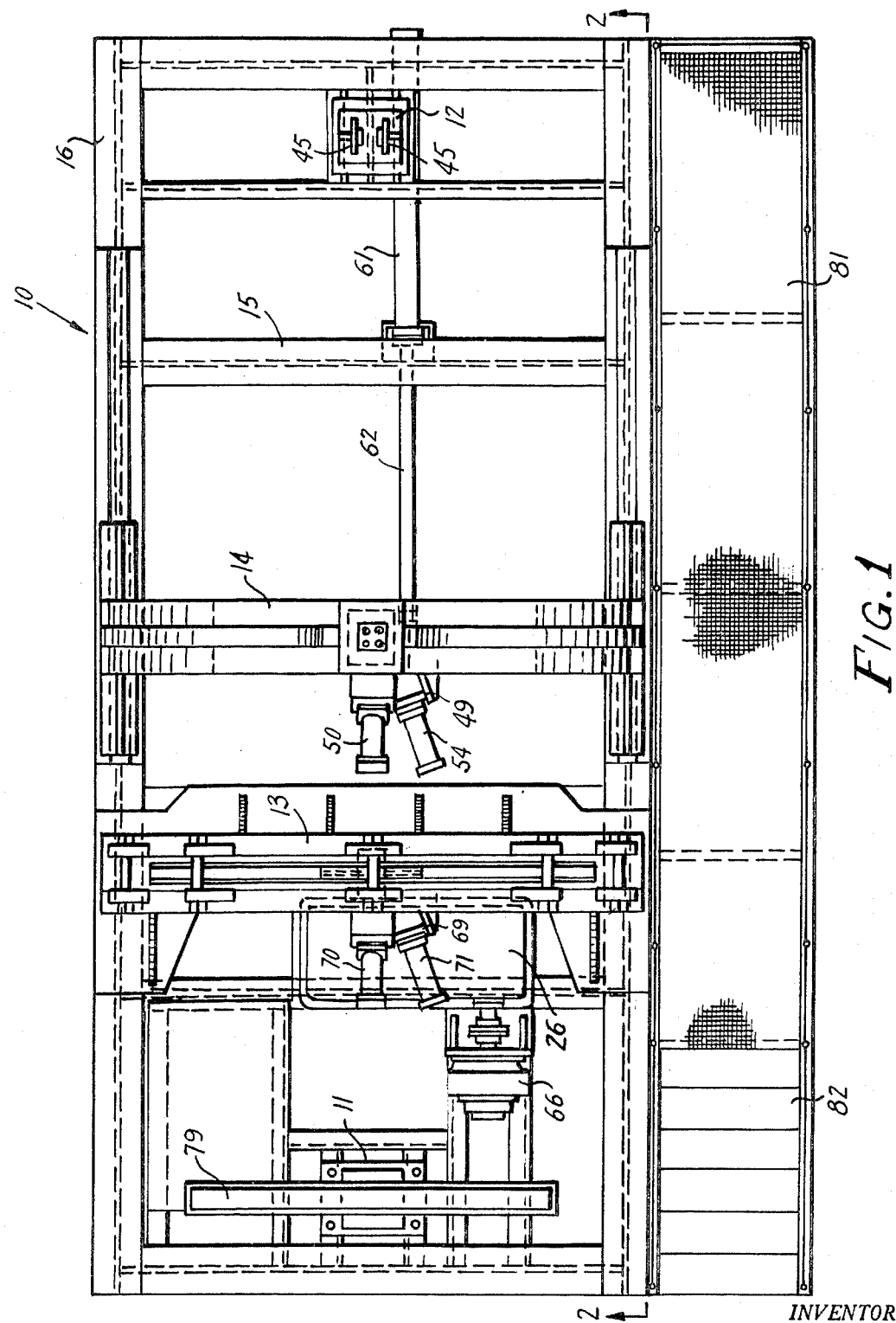
FIG. 1 is a top view of the machine according to the invention.

The frame is made up of a rigid base structure 10 having the I-beams 16 disposed in parallel relation to each other at each side of the machine and extending from one end to the other. The I-beams are connected together laterally by lateral structural members. Ways 18 are supported on the I-beams 16 and they provide a track for the carriage 14 to move upon. The carriage 14 may be locked in position by locking members 19 which are supported on the frame by a plate 20 which is in turn carried on channels 21 and I-beams 22. The I-beams 16, channels 21 and I-beams 22 and plate 20 make up a rigid structure welded together and making up a part of the machine frame. Gussets 23 are spaced along the sides of the machine and welded to the I-beams 16.

The twisting arrangement 13 is supported on the longitudinal beams 16. The torsional member frame 24 is welded to the rigid frame structure of the machine. The torsional drum 25 is rotated by motor 66 and gear reducer 26 which are supported on the transverse beams 27 and deck 28. The exit support 11 has a vertical support 29 rigid with the machine frame and the cylinder 80 is fixed to support 29.

The entry support 12 has a frame 31 supported on channels 32 which are welded to the main frame. The entry support 12 has a hydraulic cylinder 30 connected to the channels 34 which are likewise welded to the main frame.

Figure 5:
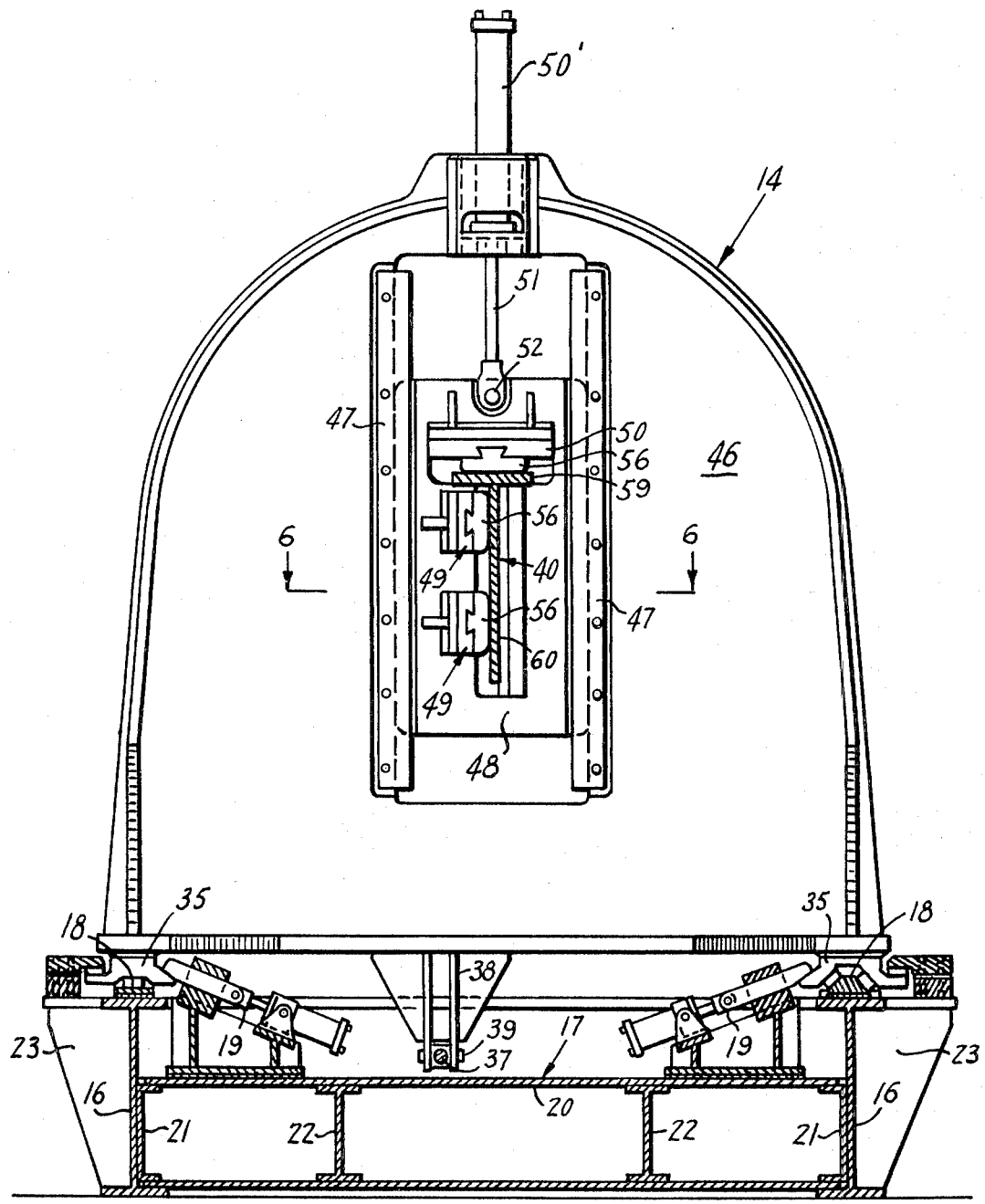
FIG. 5 is a cross sectional view taken on line 5—5 of FIG. 2 showing the carriage.

The carriage 14 shown in detail in FIG. 5 has bearing members 35 which are carried on the ways 18. The carriage is moved along the ways 18 by the hydraulic cylinder 36 which is attached to the machine frame and has a piston rod 37 fixed to the clevis 38 of the carriage by a pivot connection 39. The entire machine is intended to bend and twist a beam indicated at 40 which may be in the form of a T-shape as indicated in FIG. 5 or other structural shape.

GENERAL OPERATION OF THE MACHINE

Figure 2:
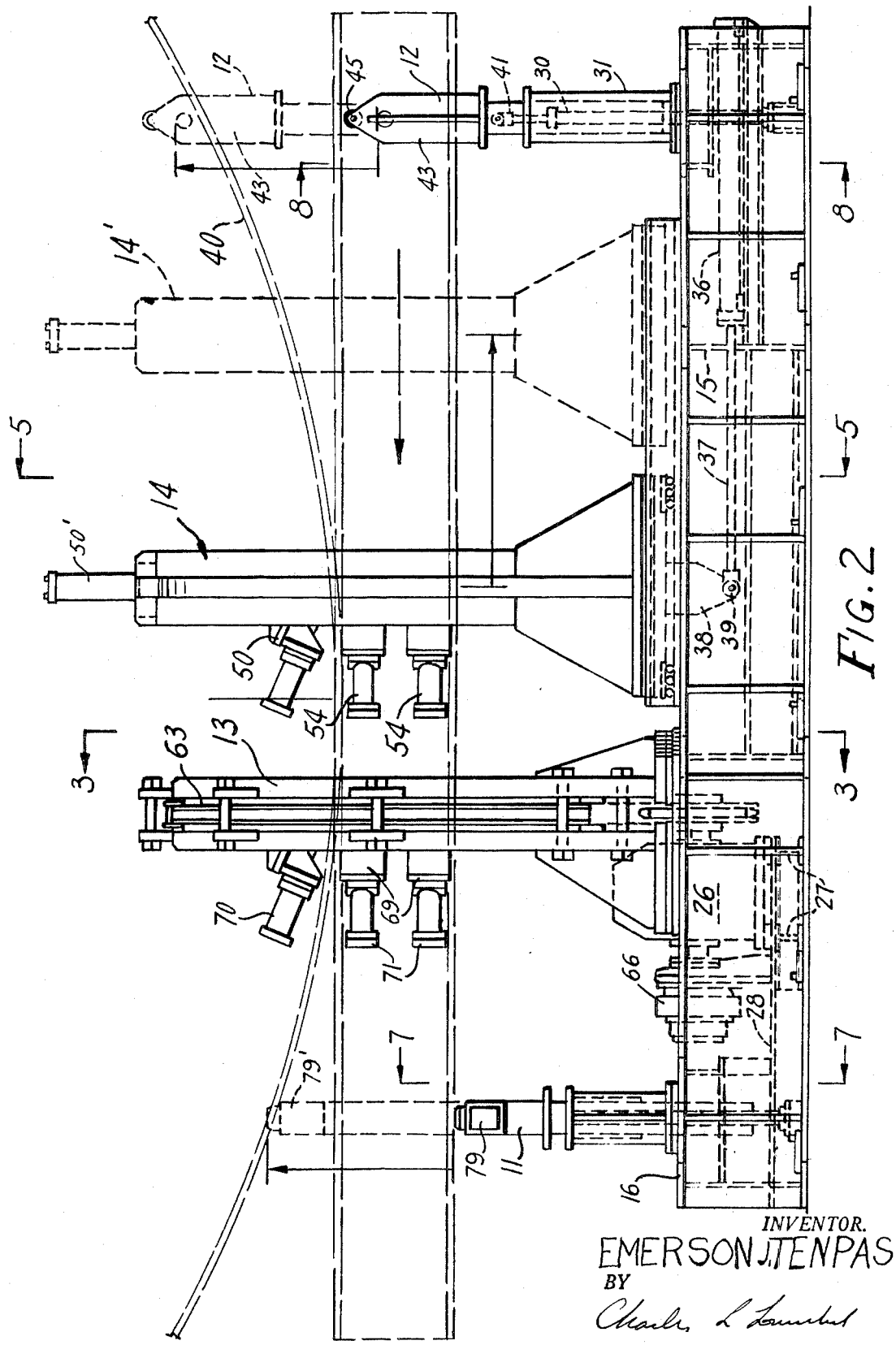
FIG. 2 is a side view of the machine shown in FIG. 1.

A beam 40 to be twisted, straightened or bent is indicated at 40 in FIG. 2. This beam would be delivered to the machine and have its end supported on the entry support 12. The carriage would be moved to the right to the phantom line position 14' in FIG. 2 and the beam 40 clamped into the carriage. The carriage would then be moved to the left to the full line position thereby advancing the beam. Then the clamping arrangements 49 and 61 on the carriage 14 would be released and the carriage brought back to the phantom line position 14' and again clamped to the beam. The beam would then be advanced to bring its forward end to the torsional arrangement 13 where it would be clamped and the proper twist put in the beam for that increment of length. The beam would then continue to be advanced in convenient increments by the carriage 14 to its ultimate position with the bending and/or twisting operations complete.

As the beam 40 moves through the machine, it would be twisted to the proper degree by the twister 13 and while being held in place by the carriage 14, it would also have the proper vertical bend put in it by the vertical cylinder 50 of the carriage 14.

ENTRY SUPPORT

The entry support 12 is made up of the vertical rigid member 31 which is fixed to the machine frame. The entry support cylinder has a piston rod 41 which is fixed to the beam engaging member 42. The beam engaging member 42 can be moved up and down a total travel distance; for example, 48 inches, along the arrow indicated at 43, thus supporting a curved beam by the engagement of roller 45 and lateral rollers 44 to the lower edge and sides of the beam respectively.

CARRIAGE

The carriage 14 shown in detail in FIG. 5 is made to positively clamp onto the beam 40 and to move the beam 40 in the direction of exit, then to unclamp and the carriage to move back and the operation to be repeated.

The carriage has a frame 46 fixed to the bearing members 35 that rest on ways 18. The frame has vertical guides 47 which act as guide means which guide the beam carrying member 48 which has the clamping members 49 fixed to it. The beam carriage 48 is moved up and down by a hydraulic cylinder 50 which is fixed to the carriage frame 46 and has a piston rod 51 attached to the beam carriage at 52. Thus a curve can be put in the beam as desired.

Figure 6:
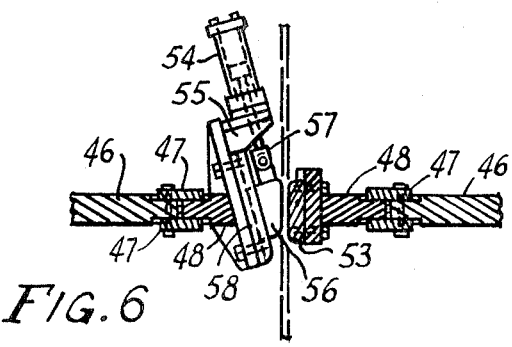
FIG. 6 is a cross sectional view taken on line 6—6 of FIG. 5.
Figure 7:
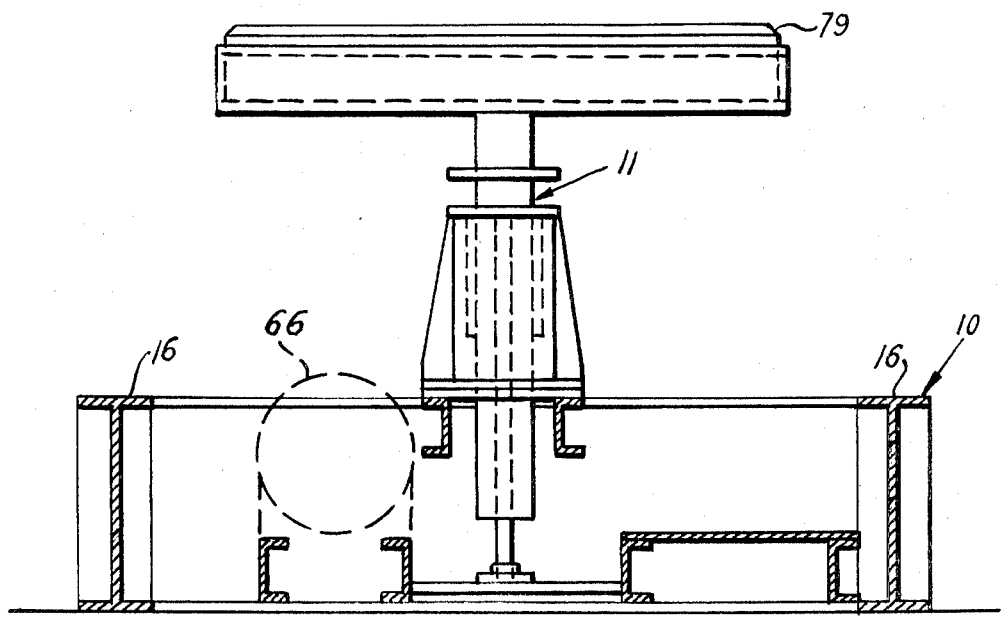
FIG. 7 is a cross sectional view taken on line 7—7 of FIG. 2.
Figure 8:
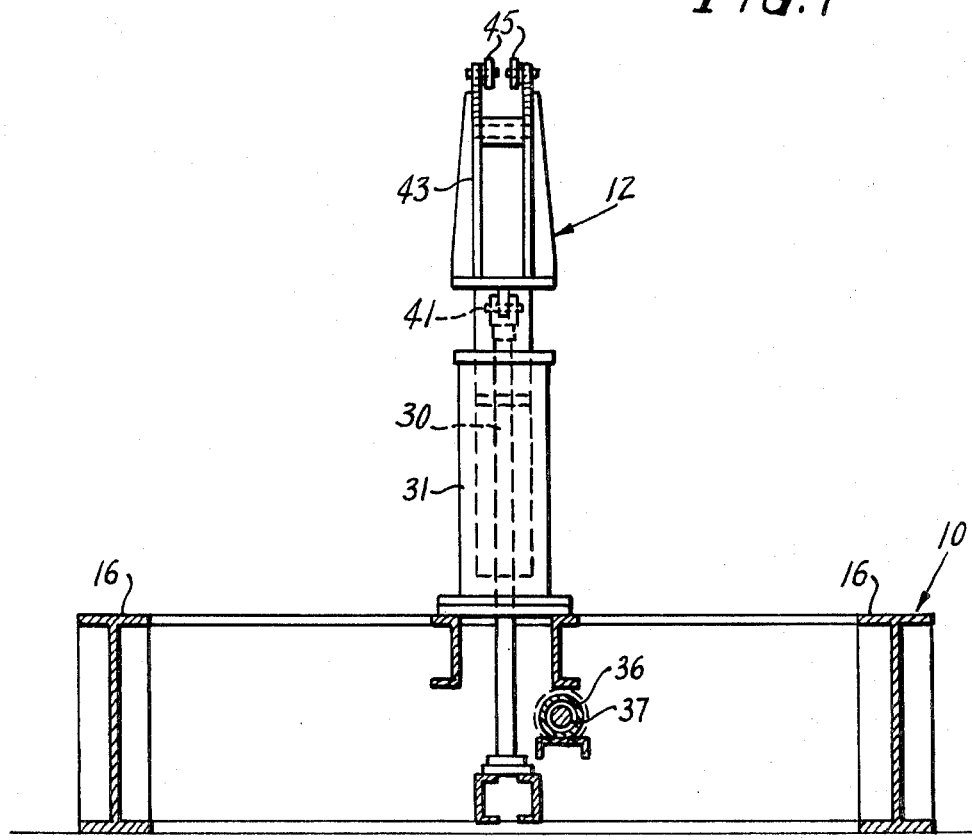
FIG. 8 is a cross sectional view taken on line 8—8 of FIG. 2.

The clamping arrangement is best known in FIG. 6. The clamping arrangement is made up of a backing member 53 fixed to the beam carriage 48 by bolts as shown. The clamping cylinders 54 are fixed to the brackets 55 and the brackets are in turn fixed to the plate 58. A wedge 56 is fixed to the piston rod 57 of cylinder 54 and when the piston is extended, the wedge will slide down the plate 58 and clamp the beam 40 between the backing 53 and the wedge 56.

The clamping members 49 on the carriage are identical. The clamping member 61 is similar in operation to the clamping members 49. However, the wedge 56 of clamping arrangement 61 engages the flange 59 of the beam 40 while the wedges 56 of the clamping members 49 engage the web 60 of the beam. The carriage 14 is moved along the tracks 18 by the cylinder 36. Cylinder 36 is fixed to the frame and it has a piston rod 37 connected at 39 to the clevis 38 as aforesaid. Thus the beam 40 can be clamped and unclamp by actuating the cylinders 54 and, when clamped, the beam can be moved relative to the frame and relative to the twisting member 13.

TWISTING ARRANGEMENT

Figure 3:
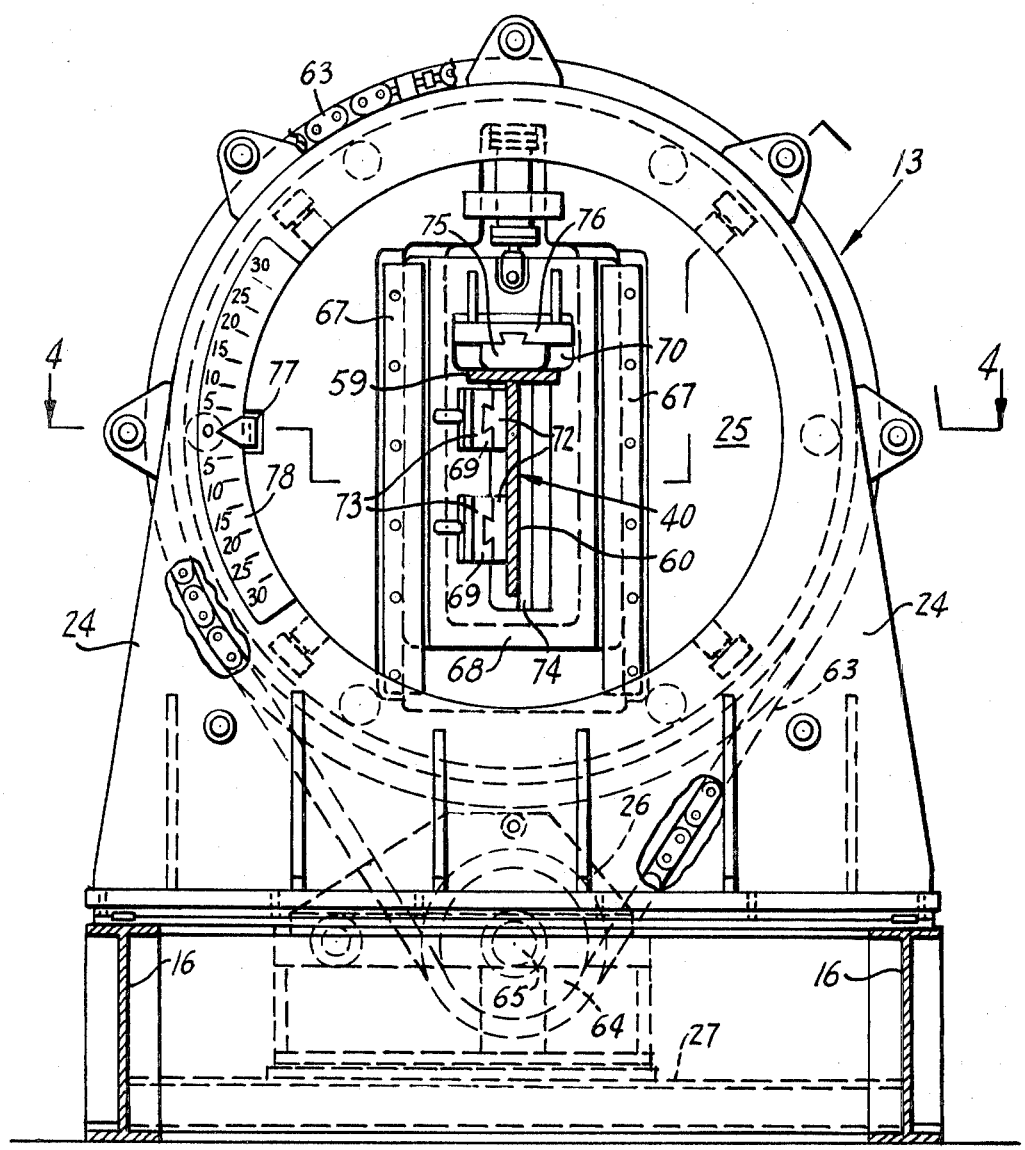
FIG. 3 is a cross sectional view taken on line 3—3 of FIG. 2 showing the torsional drum according to the invention.
Figure 4:
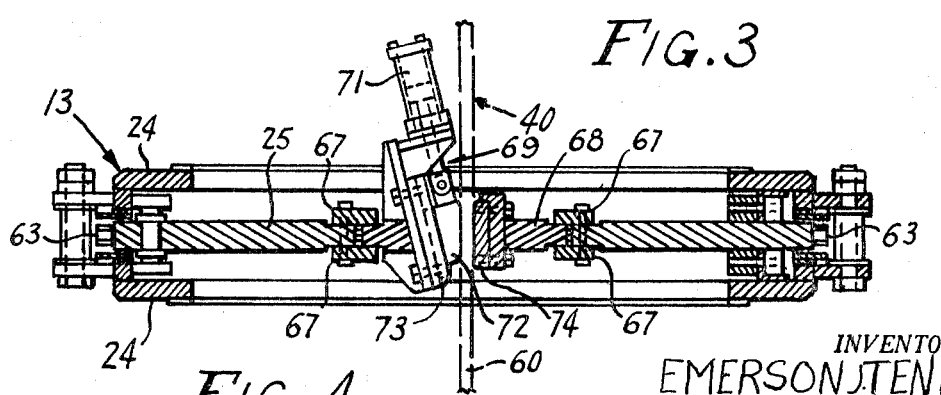
FIG. 4 is a view taken on line 4-4 of FIG. 3.

The twisting arrangement 13 shown in detail in FIG. 3 has the torsional frame 24 fixed to the machine frame as aforesaid and has the torsional drum 25 rotatably mounted in the frame 24. A chain 63 is fixed to the outside of the drum 25 rotatably mounted in the frame 24. A chain 63 is fixed to the outside of the drum and the chain is driven by a sprocket 64 connected to the shaft 65 of the speed reducer 26. The speed reducer 26 is driven by the motor 66 and both motor 66 and speed reducer 26 are fixed to the main frame. The drum 25 has ways 67 which provide tracks to receive the clamping assembly 68. The clamping assembly 68 has the clamping members 69 and clamping members 70. Clamping members 69 have cylinders 71 which carry wedges 72. Wedges 72 slide along plate 73 urged by the cylinder 71 to clamp the web 60 against the backing plate 74. Thus the beam 40 with the wedges 72 in engagement with the web 60 and the wedge 75 of the vertical clamping member 70 in engagement with the flange 59. With the beam 40 thus clamped, the motor 66 can be driven to move the drum 25 the proper number of degrees indicated by the stylus 77 on scale 78. Scale 78 is fixed to the torsional frame 24 and the stylus 77 moves with the drum 25. Thus with the beam clamped in the carriage, FIG. 5, the beam can be twisted precisely by means of the twisting member shown in FIG. 3.

EXIT SUPPORT

The exit support 11 has a beam supporting platform 79 which is carried by the piston rod 76 of the cylinder 80. Thus the platform 79 may be moved and adjusted in position up to the position 79' by means of the cylinder 80 to provide a support for the beam.

The foregoing specification sets forth the invention in its preferred practical forms but the structure shown is capable of modification within a range of equivalents without departing from the invention which is to be understood is broadly novel as is commensurate with the appended claims.

In the embodiments of the invention in which an exclusive property or privilege is claimed are defined as follows:

1. A machine for bending an elongated structural member having a platelike web and a flange comprising,
a frame,
guide means for moving said structural member along said frame,
a shape twisting member on said frame,
and means on said twisting member to twist said structural member predetermined amounts,
means on said twisting member to clamp said flange and said web of said structural member thereon,
means on said guide means to rigidly clamp said platelike web of said structural member and means on said guide means to exert a vertical force on said structural member,
said guide means comprises track members,
and ways on said frame,
said track members slidably supporting said guide means on said ways,
and an elongated fluid cylinder on said frame,
piston rod means in said cylinder,
said piston rod and said cylinder being connected to said guide means and said frame,
said cylinder being adapted to reciprocate said guide means on said frame,
said means to clamp said structural member to said guide means comprises a back plate adapted to engage a platelike part of said structural member,
a platelike member spaced from said back member,
and a wedge disposed between said platelike member and said back plate,
piston and cylinder means connected to said wedge and adapted to force said wedge to slide on said platelike member toward said back plate, whereby said structural member is clamped therebetween.

2. The machine recited in claim 1 wherein at least two said wedge members are disposed adjacent said structural member,
and a third said wedge is disposed above said structural member for forcing said structural member down into engagement with a stop.

3. The machine recited in claim 1 wherein said clamp means on said twisting member comprises a backing plate for engaging a side of said structural member,
and wedge means for clamping said structural member to said plate.

4. The machine recited in claim 3 wherein said machine has an entry support thereon spaced from said guide means and adapted to support the entry end of said structural member,
said entry support having laterally spaced structural engaging members thereon,
and means to engage the bottom of said structural member for adjusting the vertical position of said structural engaging member.

5. The machine recited in claim 4 wherein said entry support has laterally spaced rollers and said means to engage the bottom of said guide means comprises a roller.

6. The machine recited in claim 5 wherein said means for adjusting the vertical position of said entry support, said guide means comprises a vertically disposed cylinder.

* * * * *